(12) United States Patent
Wery et al.

(10) Patent No.: US 8,708,649 B2
(45) Date of Patent: Apr. 29, 2014

(54) ARCHITECTURE OF A COMPRESSOR RECTIFIER

(75) Inventors: Xavier Wery, Liège (BE); Alain Derclaye, Couthuin (BE); Enrique Penalver Castro, Soumagne (BE)

(73) Assignee: Techspace Aero S.A., Milmort (BE)

( * ) Notice: Subject to any disclaimer, the term of this patent is extended or adjusted under 35 U.S.C. 154(b) by 563 days.

(21) Appl. No.: 12/968,818

(22) Filed: Dec. 15, 2010

(65) Prior Publication Data
US 2011/0150643 A1 Jun. 23, 2011

(30) Foreign Application Priority Data

Dec. 22, 2009 (EP) ..................................... 09015844

(51) Int. Cl.
*F01D 9/04* (2006.01)
(52) U.S. Cl.
USPC ...................................................... 415/209.3
(58) Field of Classification Search
USPC ........ 415/209.3, 200, 209.1, 209.4, 232, 142; 416/210 A, 212 R, 212 A, 214 R, 217, 416/204 A, 248, 191
See application file for complete search history.

(56) References Cited

U.S. PATENT DOCUMENTS

| | | | | |
|---|---|---|---|---|
| 924,546 A | * | 6/1909 | Emmet | 416/191 |
| 2,857,093 A | * | 10/1958 | Warnken | 415/209.3 |
| 4,180,371 A | * | 12/1979 | Ivanko | 415/115 |
| 4,655,682 A | * | 4/1987 | Kunz et al. | 415/119 |
| 4,785,625 A | | 11/1988 | Stryker et al. | |
| 4,832,568 A | * | 5/1989 | Roth et al. | 415/189 |
| 5,083,900 A | * | 1/1992 | Carletti et al. | 415/209.3 |
| 5,740,674 A | | 4/1998 | Beutin et al. | |
| 6,343,912 B1 | * | 2/2002 | Manteiga et al. | 415/138 |
| 6,425,738 B1 | * | 7/2002 | Shaw | 415/208.1 |
| 6,890,151 B2 | * | 5/2005 | Bertrand et al. | 415/209.2 |
| 7,673,461 B2 | | 3/2010 | Cameriano et al. | |
| 2008/0279679 A1 | * | 11/2008 | Morrison | 415/191 |
| 2009/0169375 A1 | | 7/2009 | Cortequisse | |

FOREIGN PATENT DOCUMENTS

| | | |
|---|---|---|
| EP | 0761931 A1 | 3/1997 |
| EP | 0942150 A2 | 9/1999 |
| EP | 1770246 A2 | 4/2007 |
| EP | 2075413 A1 | 7/2009 |
| GB | 2004329 A | 3/1979 |

* cited by examiner

*Primary Examiner* — Nathaniel Wiehe
*Assistant Examiner* — Kayla McCaffrey
(74) *Attorney, Agent, or Firm* — Reinhart Boerner Van Deuren P.C.

(57) ABSTRACT

The present invention relates to a turbine engine rectifier stage comprising a plurality of fixed vanes connecting an inner ferrule support 19 to an outer ferrule support 14, said inner ferrule support and said outer ferrule support defining an aerodynamic vein and comprising a set of contiguously assembled sectors 20,15 respectively, the plurality of fixed vanes comprising so-called structural vanes 5 surrounding so-called non-structural or aero vanes 6 so as to form boxes 7, said structural vanes 5 being rigidly attached to the ends of the sectors of the inner ferrule support 20 by means of attachment elements 17 in order to impart increased stiffness to the boxes 7.

18 Claims, 6 Drawing Sheets

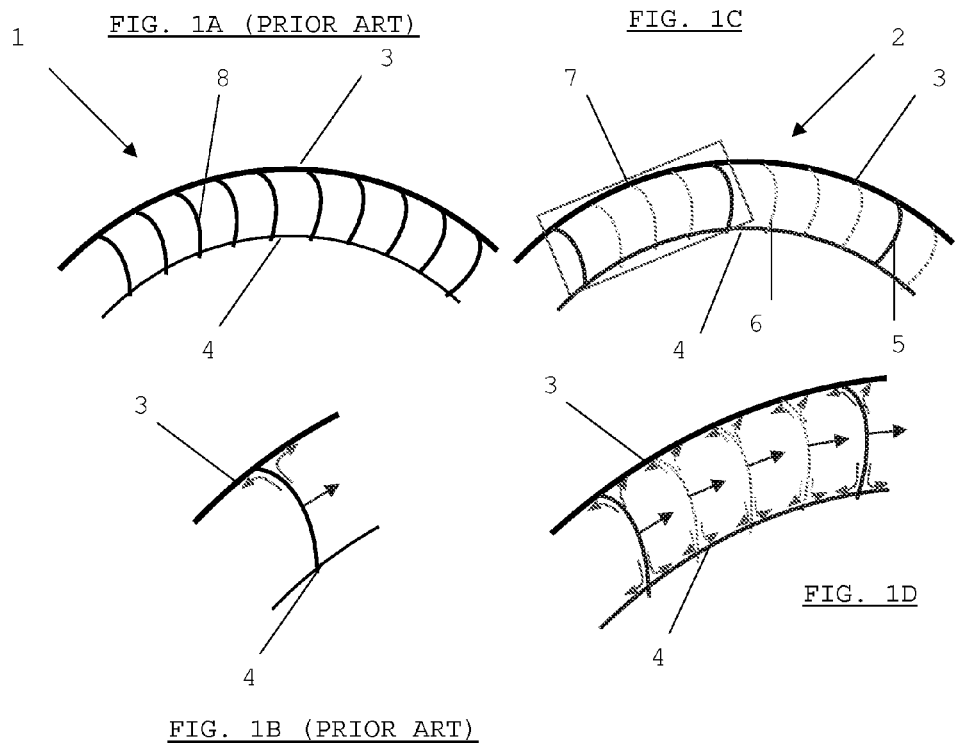
FIG. 1A (PRIOR ART)
FIG. 1C
FIG. 1B (PRIOR ART)
FIG. 1D
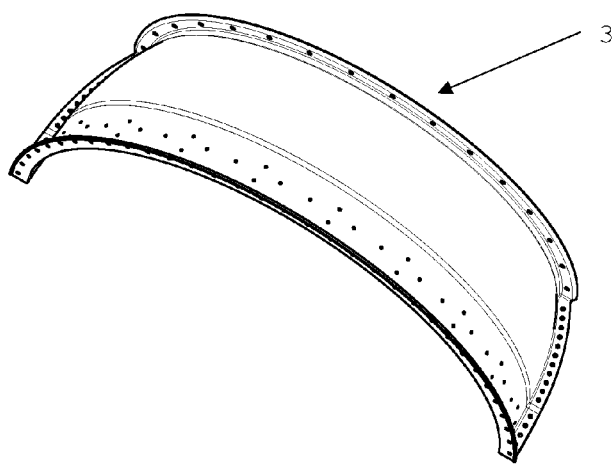
FIG. 2

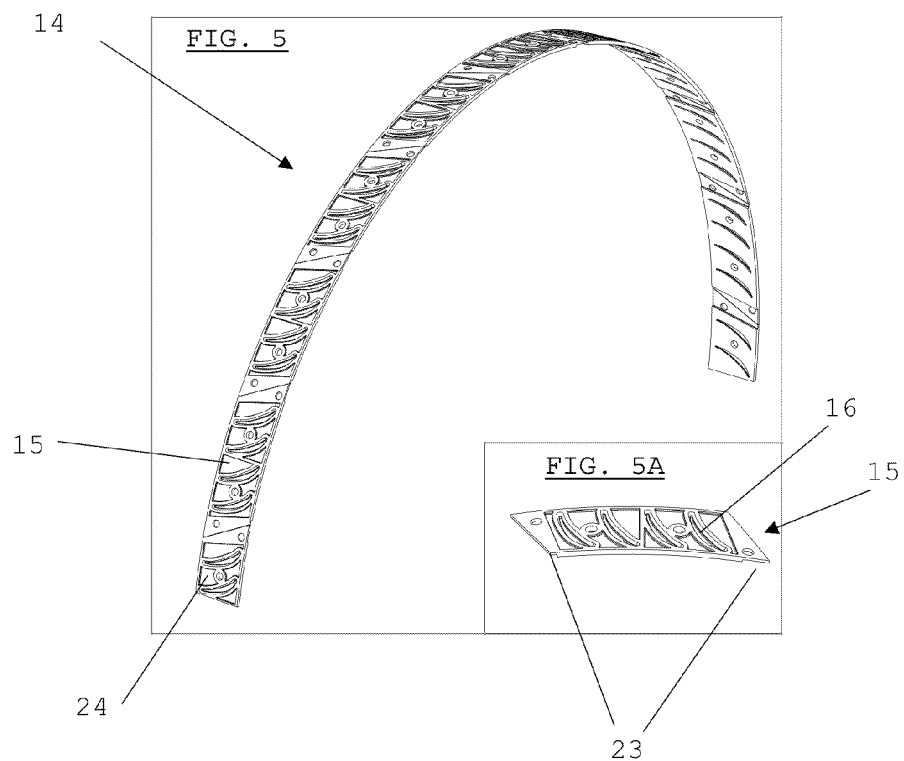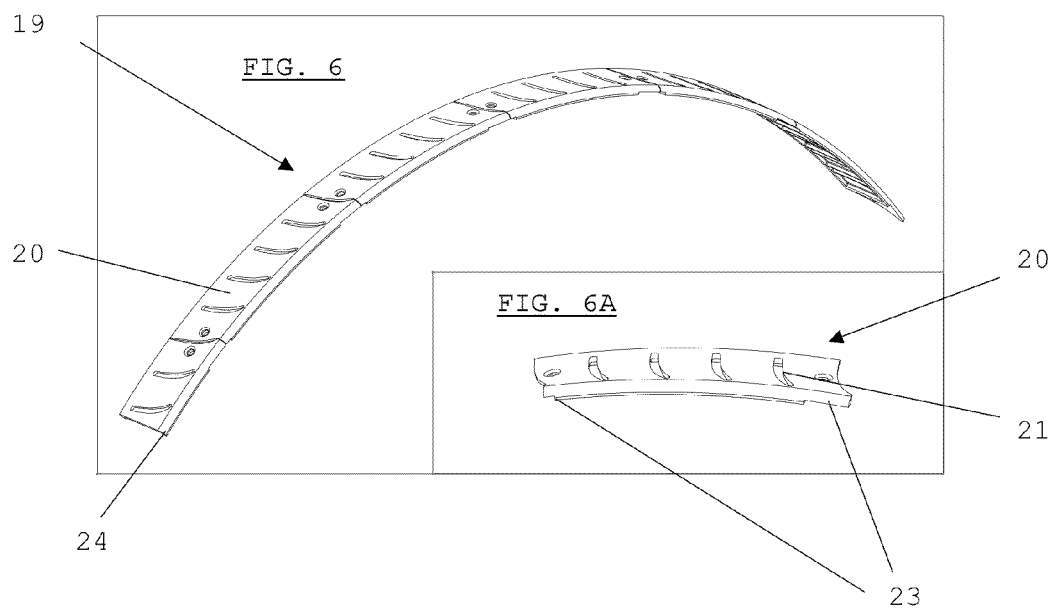

ARCHITECTURE OF A COMPRESSOR RECTIFIER

CROSS-REFERENCE TO RELATED APPLICATIONS

This patent application claims the benefit of European Application No. 09015844.5, filed Dec. 22, 2009, the entire teachings and disclosure of which are incorporated herein by reference thereto.

FIELD OF THE INVENTION

The present invention relates to the field of turbine engines. It more particularly relates to a rectifier architecture in an axial compressor of a turbine engine.

STATE OF THE ART

Axial compressors are well known per se and are used inter alia in turbine engines.

These low-pressure or high-pressure compressors comprise several stages of rotating vanes that are separated by rectifier stages which have the purpose of repositioning the velocity vector of the fluid exiting the previous stage before sending it to the next stage.

These rectifier stages are essentially made of fixed vanes, also called stator vanes, connecting an outer ferrule to an inner ferrule, both concentric and defining the airflow zone or aerodynamic vein. The whole of the outer ferrules forms the casing. The rectifier may be made of an assembly of several stages that are slipped on stagewise or may be made of a one-piece assembly that directly integrates several stages, optionally via a half-shell technology.

According to the state of the art, the rectifiers are made of a metal material (TA6V, steel or aluminium) and the vanes within the rectifier are essentially of a single material and single profile on a same stage. The outer ferrule ensures the essential part of the mechanical functions. The inner ferrules, as for them, are relatively flexible; as a consequence, they do not provide any structural function and do not provide much stiffness to the system. The vanes are added onto the outer ferrules by various assembling technologies (welding, riveting, bolting) and are attached to the inner ferrules by a flexible joint (commonly of the silicone type).

In order to stiffen the stator, document EP 2 075 413 A1 presents a rectifier stage comprising a plurality of stiffeners distributed among the stator vanes. These stiffeners each ensure a mechanical connection between the outer ferrule and the inner ferrules, by thereby limiting the displacements of the latter. The presence of stiffeners with a very different profile from that of aerodynamic vanes causes aerodynamic perturbations that have to be compensated for by the use of vanes with variable incidence and/or with a variable profile among them.

Aims of the Invention

The present invention aims to provide a solution that allows to overcome the drawbacks of the state of the art.

The present invention more particularly aims to provide a stiffened rectifier architecture without causing significant aerodynamic perturbations within the rectifier.

The present invention also aims to provide a rectifier using composite materials with an overall stiffness equivalent to a 100% metal configuration.

The present invention also aims to manufacture vaned rectifiers of low mass and low cost for any compressor comprising an assembly of the stator type proposed together with a rotor, either of the type with one-piece vaned discs, or with a drum or other components.

The present invention also aims to provide a modular rectifier architecture optimizing the requirements in terms of mechanical strength, stiffness, cost and reparability.

Main Characteristic Elements of the Invention

The present invention relates to a turbine-engine rectifier stage comprising a plurality of fixed vanes connecting an inner ferrule support to an outer ferrule support, said inner ferrule support and said outer ferrule support defining an aerodynamic vein and comprising a set of contiguously assembled sectors respectively, the plurality of fixed vanes comprising so-called "structural" vanes surrounding so-called "non-structural" vanes or "aero" vanes so as to form boxes, said structural vanes being rigidly attached to the ends of the sectors of the inner ferrule support by means of attachment elements in order to impart increased stiffness to the boxes.

According to particular embodiments of the invention, the rectifier stage comprises at least one or a suitable combination of the following features:

- each structural vane comprises a platform at the blade head and a platform at the blade foot, said platforms comprising holes for the passage of attachment elements and ensuring a stiff attachment, once they are assembled to the sectors of the respective inner and outer ferrule supports;
- each aero vane comprises a foot, located in the alignment of the plane of the blade, and a bulb or platform, located at the head of the blade, said platform being normal to the plane of the blade;
- each sector of the outer ferrule support comprises a zone of reduced thickness at each of its ends, said zone forming with the zone of the sector positioned side by side, a housing for the platform at the blade head of the structural vane, said housing being of dimensions that are substantially equal to the dimensions of the platform at the blade head of a structural vane and being positioned within the aerodynamic vein;
- each sector of the inner ferrule support comprises a zone of reduced thickness at each of its ends, said zone forming with the zone of the sector positioned side by side, a housing for the platform at the blade foot of the structural vane, said housing being of dimensions that are substantially equal to the dimensions of the platform at the blade foot of a structural vane and being positioned outside the aerodynamic vein;
- each sector of the outer ferrule support comprises piercings intended to receive the bulb or platform of the aero vanes and holes for the passage of attachment elements;
- the sectors of the outer ferrule support are attached to a casing comprising holes for the passage of attachment elements, and the platforms at the blade head of the structural vanes are attached together to the sectors of the outer ferrule support and to the casing;
- each sector of the inner ferrule support comprises piercings intended for receiving the feet of the aero vanes as well as holes intended for receiving the attachment elements ensuring the assembling of the platforms at the foot of the structural vanes with the sectors of the inner ferrule support;

the attachment elements are positioned in metal nozzles at the level of said holes;

an elastomeric joint fills the gap between the foot of the aero vane and the piercing;

the attachment elements comprise lock-bolts;

the bulb comprises two tilted supporting faces intended to be placed as an interface with the sector of the outer ferrule support, as well as a third supporting face that is perpendicular to the plane of the blade intended to be placed as an interface with the casing;

the casing is made of composite or metal material;

the structural vanes are made of a stiffer material than the aero vanes;

the structural vanes and the aero vanes are made of a metal and composite material, respectively;

the inner ferrule support and the outer ferrule support are made of composite material;

the structural vanes have a thicker profile than the aero vanes.

The present invention also relates to a turbine-engine compressor comprising a plurality of rectifier stages as described above. According to a particular embodiment of the invention, the compressor comprises a half-shell casing that integrates several rectifier stages.

SHORT DESCRIPTION OF THE DRAWINGS

FIGS. 1A and 1B illustrate a schematic view of the conventional design of a rectifier as in the state of the art and of the resulting distribution of the forces, and FIGS. 1C and 1D illustrate a schematic view of the architecture in the form of boxes as in the invention and of the resulting distribution of forces. Collectively, FIGS. 1A-1D may be referred to as FIG. 1 herein.

FIG. 2 illustrates a three-dimensional view of the casing half-shell used in the rectifier architecture as in the invention.

FIG. 5 illustrates a three-dimensional view of the outer ferrule support (as a half shell) and FIG. 5A being an enlarged view of a sector of the outer ferrule support of FIG. 5 as in the invention.

FIG. 6 illustrates a three-dimensional view of the inner ferrule support (as a half shell) and FIG. 6A being an enlarged view of a sector of the inner ferrule support of FIG. 6 as in the invention.

KEY

Figures 3, 3A:
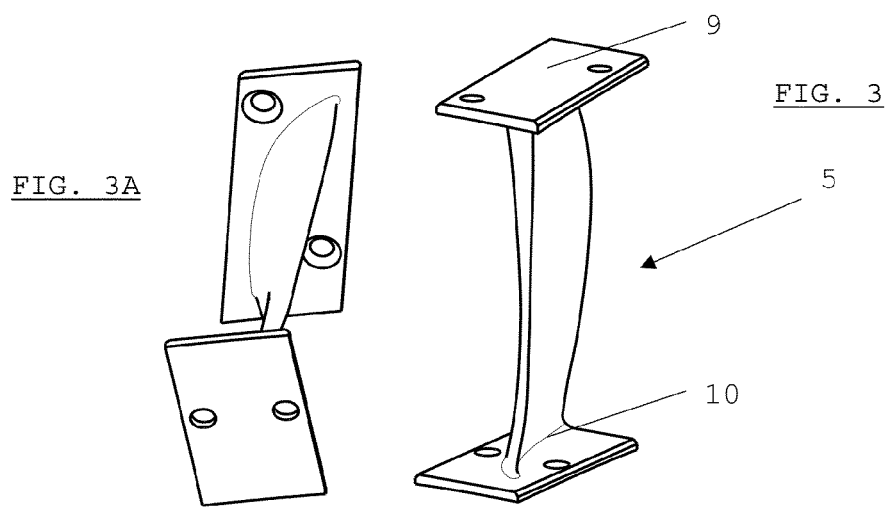
FIGS. 3 and 3A illustrate two three-dimensional views of the structural vane used in the rectifier architecture as in the invention.

1. Conventional schematic architecture of a rectifier
2. Schematic architecture of a rectifier as in the invention
3. Outer ferrule or casing or casing half-shell
4. Inner ferrule
5. So-called "structural" vane
6. So-called "non-structural" or "aero" vane
7. Box
8. Stator vane
9. Platform of the structural vane at the blade head
10. Platform of the structural vane at the blade foot
11. Foot of the aero vane
12. Blade of the aero vane
13. Bulb of the aero vane
14. Outer ferrule support
15. Sector of the outer ferrule support
16. Piercing in the sector of the outer ferrule support
17. Attachment elements, for example lock-bolts
18. Metal nozzle
19. Inner ferrule support
20. Sector of the inner ferrule support
21. Piercing in the sector of the inner ferrule support
22. Pre-moulded joint
23. Area of reduced thickness on the sector of the outer ferrule support and on the sector of the inner ferrule support
24. Sector located at the ends of the inner ferrule and outer ferrule supports in a half-shell architecture

DETAILED DESCRIPTION OF THE INVENTION

The present invention relates to a new architecture of a compressor rectifier. In a conventional design 1, as aforementioned and schematically illustrated on the left in FIG. 1, the structural function is ensured by the sole outer ferrule 3 and the stator vanes 8 are made of a same material and have a same profile. As a result, all the forces are distributed over the outer ferrule 3 (FIG. 1 on the left, lower portion). The architecture as in the present invention 2 consists in combining vanes with different stiffnesses within a rectifier stage. The stage comprises so-called structural vanes 5 on the one hand, which impart stiffness to the system, and non-structural vanes 6 with a mainly aerodynamic function. The structural vanes 5 surrounding the non-structural vanes 6 define boxes 7. According to the invention and as will be detailed below, the structural vanes are rigidly assembled to the inner ferrules, thereby providing the latter with increased mechanical function, consequently increasing the stiffness of the system. As a result, the forces are distributed over the outer ferrule 3 and over the inner ferrule 4 (FIG. 1 on the right, lower portion).

Figure 8:
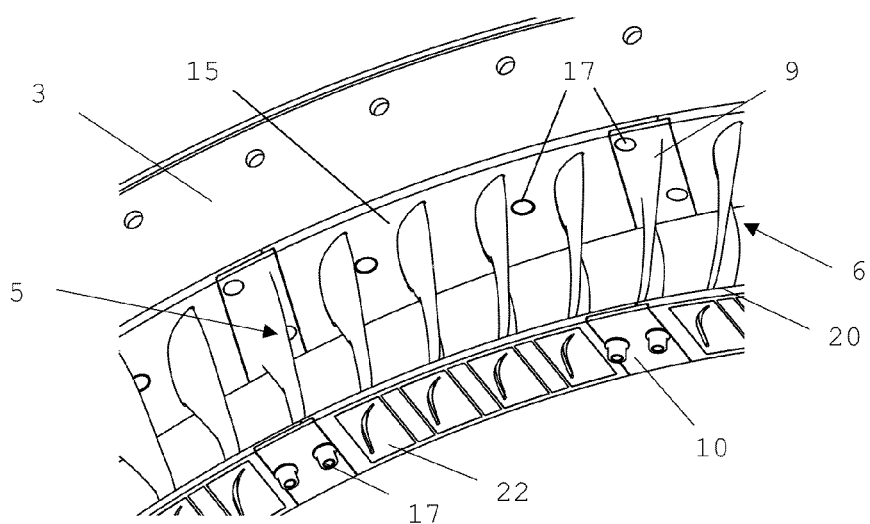
FIG. 8 illustrates a partial three-dimensional view of the rectifier architecture as in the invention.
Figure 9:
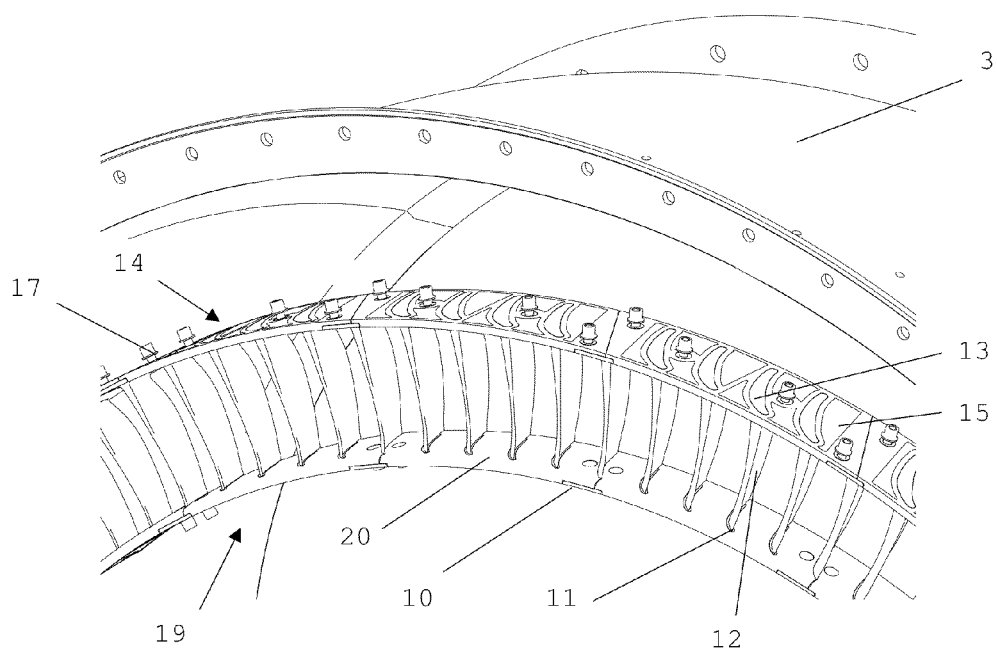
FIG. 9 illustrates a partial and exploded three-dimensional view of the rectifier as in the invention.

The rectifier architecture as in the invention and as illustrated in FIGS. 8 and 9 results from the assembling of five main elements that will be described below:

an outer ferrule or casing 3, an outer ferrule support 14 comprising a set of sectors 15 and intended to be attached to the casing 3, an inner ferrule support 19 comprising a set of sectors 20 and forming the inner ferrule after assembly, a set of stator vanes comprising structural vanes 5 and aero vanes 6 intended to connect the outer ferrule support 14 to the inner ferrule support 19.

The layout of these different elements will be clearer in the light of the explanations below. As an illustration, the assembling of the structural and aero vanes to the inner ferrule and to the outer ferrule will be shown for a multi-stage half-shell rectifier architecture but the rectifier comprising boxes as in the invention may also be built on the basis of a single-stage ring-shaped architecture.

The casing half-shell 3 is shown in FIG. 2. It comprises holes for attaching the outer ferrule support (for the sake of simplification, only one rectifier stage is shown here). It further comprises holes on the flanges allowing to assemble the half shells together in order to form the casing. Subsequently, this will be equally referred to as "casing half-shell" or "casing".

The structural vane 5 is illustrated in FIG. 3. It comprises a platform at the blade head 9 and foot 10 (i.e. an I-shaped architecture) so as to be rigidly attached to the outer ferrule support 14 and to the casing 3 on the one hand, and to the inner ferrule support 19 on the other hand (FIG. 8). The platforms of the structural vane comprise holes, two for example, allowing to integrate attachment elements that ensure a stiff but removable attachment. These attachment elements may be of the lock-bolt type as illustrated below, of the bolted type or of the riveted type. The platforms at the blade head 9 are positioned inside the casing 3 in order to avoid large piercings in the structural casing so as to maximise its mechanical strength (FIGS. 8 and 9). For a similar reason, the holes of the attachment systems are of the smallest possible diameter and as limited in number as possible. As will be described further on, the platforms of the structural vane allow to assemble the different constitutive parts of the outer ferrule support and of the inner ferrule support, respectively. The structural vanes provide the essential part of the stiffness of the boxes, they are manufactured in a stiffer material than the non-structural vanes and optionally are of different profiles, notably thicker.

Figure 4:
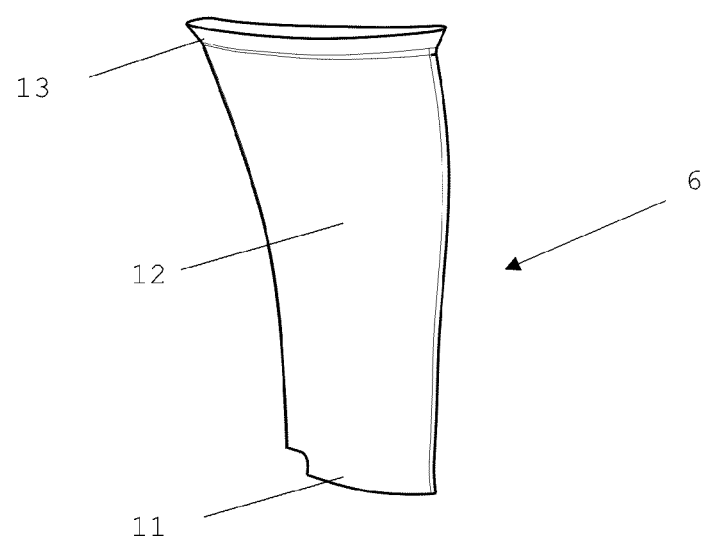
FIG. 4 illustrates a three-dimensional view of the non-structural or aero vane used in the rectifier architecture as in the invention.

The non-structural vane 6, illustrated in FIG. 4, has an architecture with a foot 11 that is located in the alignment of the plane of the blade 12 and intended to be attached to the inner ferrule support. The system for attaching the vane to the outer ferrule support may, as for it, comprise a bulb 13 which allows to position the orientation of the vane and to provide a clamping assembly. Further, the bulb allows—thanks to its undercut—to avoid the detachment of the vane from its support by sliding. This bulb has two tilted supporting faces intended to be placed as an interface with a sector of the outer ferrule support in order to axially and angularly position the aero profile of the vane, as well as a third supporting face that is perpendicular to the plane of the blade intended to be placed as an interface with the casing in order to radially attach the vane in the rectifier. The system for attaching the aero vane may also be of other types:

- still with a bulb but by welding/adhesive bonding to the outer ferrule support;
- with, instead of the bulb, a flat platform normal to the plane of the vane, also called T-shaped vane, the platform also comprising supporting faces intended to be placed as an interface with a sector of the outer ferrule support and a supporting face intended to be placed as an interface with the casing;
- by over-moulding the material of the outer ferrule support around the extension of the profile of the blade, the aero vane either comprising a bulb or not.

Figure 7:
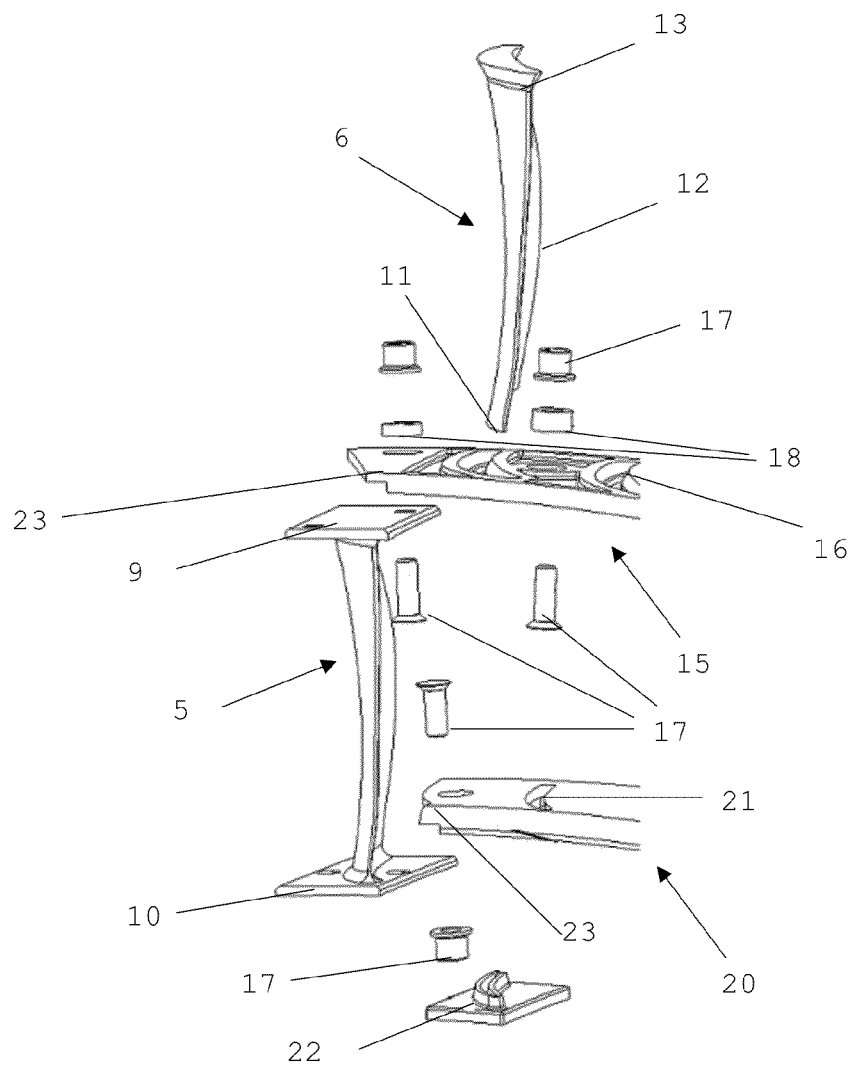
FIG. 7 illustrates an exploded view of the assembly of a structural vane and of a non-structural vane to the sector of the inner ferrule support and to the sector of the outer ferrule support as in the invention.

The outer ferrule support 14, illustrated in FIG. 5, comprises sectors 15 positioned side by side and, more specifically, in a contiguous way. Each sector 15 of the outer ferrule support comprises piercings 16, for example four, intended to receive the bulb 13 of the aero vanes 6 as shown in FIG. 7. Alternatively, the piercings are intended to receive the platform of the aero vane (not shown). It further comprises holes for the passage of the attachment elements. The sector 15 of the outer ferrule support comprises a zone 23 of reduced thickness at its ends. This zone forms after the sectors of the outer ferrule support are assembled, a housing for the platform at the blade head of the structural vane 9 as illustrated in FIG. 8. The reduction in thickness is substantially equal to the thickness of the platform at the blade head of the structural vane so that the sectors of the outer ferrule support and the platforms of the structural vanes form a continuous surface without any irregularities on the side of the aerodynamic vein. The sector 15 of the outer ferrule support is attached to the casing 3 by means of mechanical attachments such as for example lock-bolts 17 and the sectors 15 of the outer ferrule support are connected together at the level of the platform at the blade head of the structural vane 9 by attachment means (for example also of the lock-bolt type 17). The mechanical attachment means are inserted into metal nozzles 18, visible in FIG. 7, in order not to damage the sector when the attachment means is subjected to the assembling stresses. These removable attachments allow easy repair during maintenance by replacement of the box.

It will be noted in FIG. 5 that for the half-shell assemblies as illustrated here as an example, the sectors 24 located at the ends of the outer ferrule support are split into two in order to retain a same pitch (in this scenario: 4 aero vanes for 1 structural vane) when both half shells are assembled in order to form a ring.

The inner ferrule support 19 shown in FIG. 6 comprises sectors 20 positioned side by side and more specifically, contiguously. The sector 20 of the inner ferrule support comprises piercings 21 in order to allow the assembling of the foot 11 of the aero vane (FIGS. 7, 8 and 9). The aero vanes 6 are assembled by inserting beforehand a pre-moulded elastomeric joint 22 at the level of the foot. This elastomeric joint ensures the functions of filling the gap between the foot of the vane and the piercing of the sector of the inner support of vanes and also contributes to damping the vibrations of the aero vane. Nevertheless, other attachment systems may be contemplated such as over-moulding of silicone or other materials (for example thermoplastics), welding, etc. The sector 20 of the inner ferrule support further comprises holes for the passage of attachment elements. Similarly to the sector of the outer ferrule support, the sector 20 of the inner ferrule support comprises a zone 23 of reduced thickness at its ends in order to form after assembling side by side sectors of the inner ferrule support, a housing for the platform 10 at the blade foot of the structural vane as illustrated in FIG. 9. According to the invention, the platform 10 at the foot of the vane is positioned outside the aerodynamic vein. The sectors 20 of the inner ferrule support are connected together at the level of the platforms 10 at the blade foot of the structural vanes by mechanical attachment means such as for example lock-bolts 17 with metal nozzles (not shown in FIG. 7). Alternatively, a dovetail assembly may be inserted. Attaching the structural vane to the inner ferrule support allows to stiffen the whole of the box on the one hand, and prevents any risk of detachment of the sector of the inner ferrule support by loss of adhesion with the aero vanes on the other hand. It will be noted as earlier that the inner-ferrule sectors positioned at the ends of the support 24 are also split into two for similar reasons.

The assembly of the aero vanes delimited at each end by a structural vane forms the box as in the invention. This architecture of rectifier in the form of boxes increases the stiffness of the system as compared with a conventional architecture as in the state of the art and consequently allows to achieve most of the rectifier in a composite material. The casing is thus preferentially of a composite material and is advantageously obtained by the RTM method (Resin Transfer Moulding). Alternatively, the casing may also be designed on the basis of other methods (RFI for Resin Film Infusion, prepreg in an autoclave, thermoforming of thermoplastics) or be made of metal material. The structural vanes are preferentially made of metal, and more particularly made of steel (E=220 GPa) or titanium (E=110 GPa). The non-structural or aero vanes are subjected to less mechanical stresses because of the spreading of the stiffness and forces passing through the structural vanes and may accordingly be made of a less stiff material than the structural vanes. They are preferentially made of composite material with optimized manufacturing in order to reduce the costs. As mentioned earlier, the aero vanes have an architecture with a foot located in the alignment of the plane of the blade. The geometry as flat as possible for the aero vane promotes the manufacturing of this vane by a composite method such as moulding by injection or compression or pre-forming of long fibres. The sectors of the outer ferrule support and optionally inner ferrule support are preferentially of composite material and are achieved by injection or compression of long fibres with thermoplastic resin, or by thermoforming/moulding by compression of pre-forms with thermoplastic resin. The advantage of thermoplastics is to allow the use of welding methods (friction, induction, over-moulding, etc.) between thermoplastic components.

Advantages of the Rectifier Architecture as in the Invention

The concept of "modular" assembling, i.e. from elements that are provided separately, allows on the one hand to select materials and methods adapted to each function of the parts making up the assembly, and on the other hand to simplify the inspection of the parts and of the assembling method. This selection of material adapted to each function allows to achieve rectifiers with more or less noble materials depending on the parts and accordingly allows to reduce cost as compared with a one-piece architecture where all the parts are by definition made of a same material. Thus, the casings of rectifiers manufactured as in the invention will gain in mass and in cost as compared with the titanium casing because of the use of composite, which allows to reach identical performances with superior specific properties and a moderate manufacturing cost due to the better optimization of the amount of material implemented. Indeed, metal casings are made from forged parts of large size, that are heavy and expensive and require significant removal of material by machining. The manufacturing cost is also moderate as compared with a composite stator that is entirely with a thermosetting matrix because of the use of non-structural vanes that are economically manufactured, for example in injected thermoplastic.

This architecture allows to combine vanes of different stiffness but with the goal of retaining an overall stiffness that is equivalent to a 100% metal configuration (in welded titanium). This allows to optimize the aerodynamic functions more freely on a majority of aero vanes by getting rid of a certain number of limitations in terms of mechanical strength requirements.

This architecture allows to simply and economically repair the vanes, a simple replacement being much easier than in the most common present architectures (welded titanium assembly).

The stresses on the casing are limited in the case of an FBO (Fan Blade Off) because the non-structural vanes clearly transmit less forces from the rotor to the stator during this event. An additional mass reduction of the stator casing may thus be achieved.

The vibrations at the level of the aero vanes are also reduced due to elastomeric joints.

The invention claimed is:
1. A turbine-engine rectifier stage comprising a plurality of fixed vanes connecting an inner ferrule support (19) to an outer ferrule support (14), said inner ferrule support and said outer ferrule support defining an aerodynamic vein and comprising a set of contiguously assembled sectors (20,15), respectively, the plurality of fixed vanes comprising so-called structural vanes (5) surrounding so-called non-structural or aero vanes (6) so as to form boxes (7), said structural vanes (5) being rigidly attached to the ends of the sectors (20) of the inner ferrule support by means of attachment elements (17) in order to impart increased stiffness to the boxes (7); and wherein each sector of the outer ferrule support (15) comprises a zone (23) of reduced thickness at each of its ends, said zone forming with the zone (23) of the sector positioned side by side, a housing for a platform (9) of each structural vane at a blade head of each structural vane, said housing being of dimensions that are substantially equal to the dimensions of the platform (9) of each structural vane at the blade head of each structural vane and being positioned in the aerodynamic vein.

2. The rectifier stage as in claim 1, wherein each structural vane (5) comprises the platform (9) of each structural vane at the blade head of each structural vane and a platform (10) at a blade foot of each structural vane, said platforms (9,10) of each structural vane comprising holes for passage of attachment elements (17) and ensuring stiff attachment, once they are assembled to the sectors (20,15) of the respective inner ferrule supports and outer ferrule supports.

3. The rectifier stage as in claim 2, wherein each aero vane (6) comprises a foot (11) of each aero vane located in the alignment of a plane of a blade (12) of each aero vane and a bulb (13) or platform of each aero vane, located at a head of the blade of each aero vane, said platform of each aero vane being flat and normal to the plane of the blade of each aero vane.

4. The rectifier stage as in claim 3, wherein each sector (15) of the outer ferrule support comprises holes (16) intended to receive the bulb (13) or the platform of the aero vanes, and holes for the passage of attachment elements (17).

5. The rectifier stage as in claim 4, wherein the sectors (15) of the outer ferrule support are attached to a casing (3) comprising holes for the passage of attachment elements (17), and wherein the platforms (9) at the blade head of the structural vanes are attached together to the sectors (15) of the outer ferrule support and to the casing (3).

6. The rectifier stage as in claim 5, wherein the bulb (13) comprises two tilted supporting faces intended to be placed as an interface with the sector (15) of the outer ferrule support as well as a third supporting face that is perpendicular to the plane of the blade (12) intended to be placed as an interface with the casing (3).

7. The rectifier stage as in claim 5, wherein the casing (3) is made of a composite or metal material.

8. The rectifier stage as in claim 4, wherein the attachment elements (17) are positioned in metal nozzles (18) at the level of said holes.

9. The rectifier stage as in claim 4, wherein the attachment elements (17) comprise lock-bolts.

10. The rectifier stage as in claim 3, wherein each sector (20) of the inner ferrule support comprises piercings (21) intended to receive the feet (11) of the aero vanes as well as holes intended to receive the attachment elements (17) ensuring the assembling of the platforms (10) at the foot of the structural vanes with the sectors (20) of the inner ferrule support.

11. The rectifier stage as in claim 10, wherein an elastomeric joint (22) fills the gap between the foot (11) of the aero vane and the piercing (21).

12. The rectifier stage as in claim 1, wherein the structural vanes (5) are made of a more rigid material than the aero vanes (6).

13. The rectifier stage as in claim 12, wherein the structural vanes (5) and the aero vanes (6) are made of a metal and composite material, respectively.

14. The rectifier stage as in claim 1, wherein the inner ferrule support (19) and the outer ferrule support (14) are made of composite material.

15. The rectifier stage as in claim 1, wherein the structural vanes (5) have a thicker profile than the aero vanes (6).

16. Turbine engine compressor comprising a plurality of rectifier stages as in claim 1.

17. The compressor as in claim 16 comprising a half-shell casing (3) that integrates several rectifier stages.

18. A turbine-engine rectifier stage comprising a plurality of fixed vanes connecting an inner ferrule support (19) to an outer ferrule support (14), said inner ferrule support and said outer ferrule support defining an aerodynamic vein and comprising a set of contiguously assembled sectors (20,15), respectively, the plurality of fixed vanes comprising so-called structural vanes (5) surrounding so-called non-structural or aero vanes (6) so as to form boxes (7), said structural vanes (5) being rigidly attached to ends of the sectors (20) of the inner ferrule support by means of attachment elements (17) in order to impart increased stiffness to the boxes (7); and wherein each sector (20) of the inner ferrule support comprises a zone (23) of reduced thickness at each of its ends, said zone forming with the zone (23) of the sector positioned side by side, a housing for platform (10) of each structural vane at a blade foot of each structural vane, said housing being of dimensions that are substantially equal to the dimensions of the platform (10) of each structural vane at the blade foot of each structural vane and being positioned outside the aerodynamic vein.

\* \* \* \* \*